US012780750B2

(12) United States Patent
Hida et al.

(10) Patent No.: US 12,780,750 B2
(45) Date of Patent: Nov. 3, 2026

(54) METHOD FOR PRODUCING COATED CERAMIC AND FIRING FURNACE FOR CARRYING OUT SAID METHOD

(71) Applicant: NGK INSULATORS, LTD., Nagoya-City (JP)

(72) Inventors: Kazuhiro Hida, Kasugai (JP); Tetsuya Onogi, Inuyama (JP); Keiichi Wakida, Obu (JP); Yu Hashiba, Kasugai (JP)

(73) Assignee: NGK INSULATORS, LTD., Nagoya (JP)

( * ) Notice: Subject to any disclaimer, the term of this patent is extended or adjusted under 35 U.S.C. 154(b) by 20 days.

(21) Appl. No.: 18/910,072

(22) Filed: Oct. 9, 2024

(65) Prior Publication Data

US 2025/0154074 A1 May 15, 2025

(30) Foreign Application Priority Data

Nov. 14, 2023 (JP) ................................ 2023-193879

(51) Int. Cl.
*C04B 41/45* (2006.01)
*C04B 41/00* (2006.01)

(52) U.S. Cl.
CPC ...... *C04B 41/4572* (2013.01); *C04B 41/0072* (2013.01)

(58) Field of Classification Search
CPC ............ C04B 41/0072; C04B 41/4572; C04B 40/0218; C04B 40/0014; C04B 2235/667
See application file for complete search history.

(56) References Cited

U.S. PATENT DOCUMENTS 5,322,537 A * 6/1994 Nakamura .......... C04B 38/0006 55/498
5,987,882 A * 11/1999 Voss .................... B01D 53/944 123/670

(Continued)

FOREIGN PATENT DOCUMENTS

JP 2006-024502 A 1/2006
JP 2011025313 A * 2/2011

(Continued)

OTHER PUBLICATIONS

Özgür Sevgi Canarslan, et al., "Microwave Sintering of SIAION Ceramics with TiN Addition," *Materials*, Apr. 25, 2019, vol. 12, Issue 8, 1345 (13 pages).

(Continued)

*Primary Examiner* — Nathan H Empie
(74) *Attorney, Agent, or Firm* — Muncy, Geissler, Olds & Lowe, P.C.

(57) ABSTRACT

A method for producing a coated ceramic includes: a step A of preparing a pillar-shaped ceramic having a first end surface, a second end surface, and a side surface, wherein a coating material is applied to at least a part of one or both of the first end surface and the second end surface; a step B of preparing an assembly in which the ceramic and at least one heat-generating member are entirely covered with a heat-insulating material; and a step C of firing the coating material applied to at least the part of one or both of the first end surface and the second end surface facing the at least one heat-generating member by heating the at least one heat generating member of the assembly.

10 Claims, 4 Drawing Sheets

(56) References Cited

U.S. PATENT DOCUMENTS

| | | | | |
|---|---|---|---|---|
| 2006/0118546 | A1 | 6/2006 | Saijo | |
| 2011/0201493 | A1* | 8/2011 | Goto | C04B 35/195 502/100 |
| 2015/0260322 | A1* | 9/2015 | Mako, Jr. | C10L 1/06 428/34.1 |
| 2017/0219290 | A1 | 8/2017 | Sato et al. | |

FOREIGN PATENT DOCUMENTS

| | | | |
|---|---|---|---|
| JP | 2020-053118 | A | 4/2020 |
| JP | 2023-095923 | A | 7/2023 |
| WO | 2016/021173 | A1 | 2/2016 |

OTHER PUBLICATIONS

Extended European Search Report (Application No. 24206512.6) dated Mar. 28, 2025 (7 pages).

* cited by examiner

METHOD FOR PRODUCING COATED CERAMIC AND FIRING FURNACE FOR CARRYING OUT SAID METHOD

CROSS REFERENCE TO RELATED APPLICATIONS

The present invention claims the benefit of priority to Japanese Patent Application No. 2023-193879 filed on Nov. 14, 2023 with the Japanese Patent Office, the entire contents of which are incorporated herein by reference in its entirety.

FIELD OF THE INVENTION

The present invention relates to a method for producing a coated ceramic. The present invention also relates to a firing furnace for carrying out the method for producing a coated ceramic.

BACKGROUND OF THE INVENTION

Regarding heating technology using electromagnetic waves, the following prior art literatures exist.

Patent Literature 1 (Japanese Patent Application Publication No. 2020-053118) describes a heating method in which microwave is irradiated to a heat-generating body that comprises a heat-generating material containing carbon that absorbs microwave and generates heat, and a container that transmits microwave and contains the heat-generating material, the heating method characterized by measuring the temperature of the heat-generating body, raising the temperature at a heating rate of 30 (° C./sec) or more, adjusting the temperature of the heat-generating body to a target temperature, and irradiating the heat-generating body with microwave based on the measured temperature so as to maintain the temperature of the heat-generating body at the target temperature. According to the heating method, the heat-generating body can be heated to a desired temperature in a short time, and the object to be heated can be heated.

Patent Literature 2 (Japanese Patent Application Publication No. 2006-024502) describes a method for producing a microwave heat-generating body for the purpose of providing a microwave heat-generating body that can be used at high temperatures, the method characterized in that one or more ceramic powders selected from the group consisting of graphite, carbon black, silicon carbide (SiC), titanium carbide (TIC), zirconium carbide (ZrC), tungsten carbide (WC), calcium oxide (CaO), $CaO{\cdot}6Al_2O_3$, zirconium boride ($ZrB_2$), titanium boride ($TiB_2$), molybdenum boride (MoB), and calcium fluoride ($CaF^2$), are kneaded with one or more selected from the group consisting of $SiO_2$ sol, water glass, and metal alkoxide to obtain a coating liquid, and the coating liquid is applied to a ceramic substrate to form a heat generating layer on the substrate.

Patent Literature 3 (Japanese Patent Application Publication No. 2011-025313) describes a method for joining materials of the same or different types by irradiating electromagnetic waves to heat the vicinity of joining surfaces, in which a self-heating material with greater electromagnetic wave absorption characteristics than the materials to be joined is placed near the joining surfaces, and the vicinity of the joining surfaces is heated by the self-heating material, the joining method characterized in that the self-heating material is in an aggregated state of solid powder particles or lumps when placed, and the aggregated state as a whole has fluidity. According to the joining method, a self-heating body that has high electromagnetic wave absorption efficiency and fluidity is used, and by arranging the self-heating body in the vicinity of the joining surfaces, it is possible to locally heat the joining surfaces of the materials to be joined, and the method enables energy-saving, highly efficient and highly reliable joining to be performed in a short time. Patent Literature 4 (WO 2016/021173 A1) describes an invention relating to a microwave combined heating furnace for heating an object to be heated by using microwave in combination with external heating such as a burner. This microwave combined heating furnace is characterized in that it comprises a housing made of a heat-insulating material, a heating container arranged inside the housing for accommodating and heating an object to be heated, a microwave irradiation device that generates microwave using a microwave generator and irradiates the object to be heated contained in the heating container with the microwave using a microwave transmission means that transmits the microwave without passing through the outer wall of the heating container, and a heating means that heats the heating container from the outside. The heating container is formed mainly of a carbon-based material having electrical conductivity, is formed so as to be capable of reflecting microwave inside, and is configured such that the object to be heated can be heated by microwave and the heating means.

Patent Literature 5 (Japanese Patent Application Publication No. 2023-095923) describes an invention aimed at providing a microwave processing device or the like that can appropriately process an object to be processed using microwave. Specifically, it describes a microwave processing device comprising a container inside which an object to be processed moves, a microwave irradiation means having an irradiation section that irradiates the inside of the container with microwave, and a heat-generating member that is provided in a part of the container along the movement path of the object to be processed so as to cover the object to be processed and is not provided in the other part along the movement path, and absorbs microwave irradiated from the microwave irradiation means to generate heat; wherein the microwave irradiation means irradiates the part in the movement path where the heat-generating member is provided with microwave to heat the heat-generating member, and irradiates the part in the movement path where the heat-generating member is not provided with microwave to heat the object to be processed.

PRIOR ART

Patent Literature

[Patent Literature 1] Japanese Patent Application Publication No. 2020-053118

[Patent Literature 2] Japanese Patent Application Publication No. 2006-024502

[Patent Literature 3] Japanese Patent Application Publication No. 2011-025313

[Patent Literature 4] WO 2016/021173

[Patent Literature 4] Japanese Patent Application Publication No. 2023-095923

SUMMARY OF THE INVENTION

Some ceramic products are partially coated. One method for forming the coating comprises applying a coating material to a predetermined surface of the ceramic and then firing it. In this case, it has been common to place the ceramic coated with the coating material in a heating furnace and heat the ceramic entirely to fire the coating material. However, with this method, although only the coating material needs to be fired, the entire ceramic is heated, so firing is required for a long period of time and consumes a large amount of power. In addition, if the temperature of the entire ceramic is raised rapidly in order to increase production efficiency, the temperature difference between the inside of the ceramic and the vicinity of its surface becomes large, causing stress due to the difference in thermal expansion, which is likely to lead to cracks. Patent Literature 1 to 5 do not describe a heating method when partially providing a coating on the surface of a ceramic, and therefore cannot provide a method for solving the problems.

The present invention has been created in consideration of the above circumstances, and in one embodiment of the present invention, an object is to provide a method for producing a coated ceramic that enables the coating material to be fired in an energy-saving manner while suppressing the occurrence of cracks. In another embodiment of the present invention, an object is to provide a firing furnace suitable for carrying out such a method for producing.

The present inventors have conducted extensive research to solve the above problems and have completed the present invention, which is exemplified as below.

[1]

A method for producing a coated ceramic, comprising:

a step A of preparing a pillar-shaped ceramic having a first end surface, a second end surface, and a side surface, wherein a coating material is applied to at least a part of one or both of the first end surface and the second end surface;

a step B of preparing an assembly in which the ceramic and at least one heat-generating member are entirely covered with a heat-insulating material, on a condition that the at least one heat-generating member is disposed facing one or both of the first end surface and the second end surface to which the coating material is applied, and the heat-insulating material is in contact with the side surface and surrounds the side surface; and a step C of firing the coating material applied to at least the part of one or both of the first end surface and the second end surface facing the at least one heat-generating member by generating heat from the at least one heat-generating member of the assembly.

[2]

The method for producing according to aspect 1, wherein the coating material is further applied to at least a part of one or both of a portion of the side surface near the first end surface and a portion of the side surface near the second end surface of the ceramic prepared in the step A.

[3]

The method for producing according to aspect 2, wherein the heat-insulating material in the assembly prepared in the step B does not come into contact with the part to which the coating material is applied in the portion of the side surface near the first end surface and the portion of the side surface near the second end surface.

[4]

The method for producing according to any one of aspects 1 to 3, wherein the heat-insulating material in the assembly prepared in the step B contacts 60% or more of a total area of the side surface.

[5]

The method for producing according to any one of aspects 1 to 4, wherein the at least one heat-generating member in the assembly prepared in the step B has a surface that faces and is parallel to one or both of the first end surface and the second end surface to which the coating material is applied.

[6]

The method for producing according to any one of aspects 1 to 4, wherein the at least one heat-generating member in the assembly prepared in the step B has a surface that faces the entire surface of one or both of the first end surface and the second end surface to which the coating material is applied.

[7]

The method for producing according to aspect 2, or any one of aspects 3 to 6 depending from aspect 2, wherein the at least one heat-generating member in the assembly prepared in the step B has a surface facing the entire surface of one or both of the first end surface and the second end surface to which the coating material is applied, and has a surface facing the part to which the coating material is applied in the portion of the side surface near the first end surface and the portion of the side surface near the second end surface.

[8]

The method for producing according to any one of aspects 1 to 7, wherein the heat-generating member comprises a material that absorbs microwave, and the step C comprises irradiating the heat-generating member with microwave.

[9]

The method for producing according to any one of aspects 1 to 8, wherein assuming H is a length from the first end surface to the second end surface, and D is an equivalent circle diameter of the first end surface and the second end surface, $1.0 \leq H/D$ is satisfied.

The method for producing according to any one of aspects 1 to 9, wherein the ceramic has a plurality of flow paths extending from the first end surface to the second end surface.

A firing furnace for carrying out the method for producing according to any one of aspects 1 to 10, comprising:

a furnace body having a space for accommodating the assembly; and an electrical energy supply source for generating heat from the at least one heat-generating member in the assembly;

The firing furnace according to aspect 11, comprising a microwave generator as the electric energy supply source.

By carrying out the method for producing a coated ceramic according to one embodiment of the present invention, it is possible to fire the coating material that is partially applied to one or both end surfaces of the ceramic in an energy-saving manner while suppressing the occurrence of cracks.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

[1. Method for Producing Coated Ceramic]

According to one embodiment of the present invention, method for producing a coated ceramic comprises:

- a step A of preparing a pillar-shaped ceramic having a first end surface, a second end surface, and a side surface, wherein a coating material is applied to at least a part of one or both of the first end surface and the second end surface;
- a step B of preparing an assembly in which the ceramic and at least one heat-generating member are entirely covered with a heat-insulating material, on a condition that the at least one heat-generating member is disposed facing one or both of the first end surface and the second end surface to which the coating material is applied, and the heat-insulating material is in contact with the side surface and surrounds the side surface; and
- a step C of firing the coating material applied to at least the part of one or both of the first end surface and the second end surface facing the at least one heat-generating member by generating heat from the at least one heat-generating member of the assembly.

<Step A>

Figure 1:
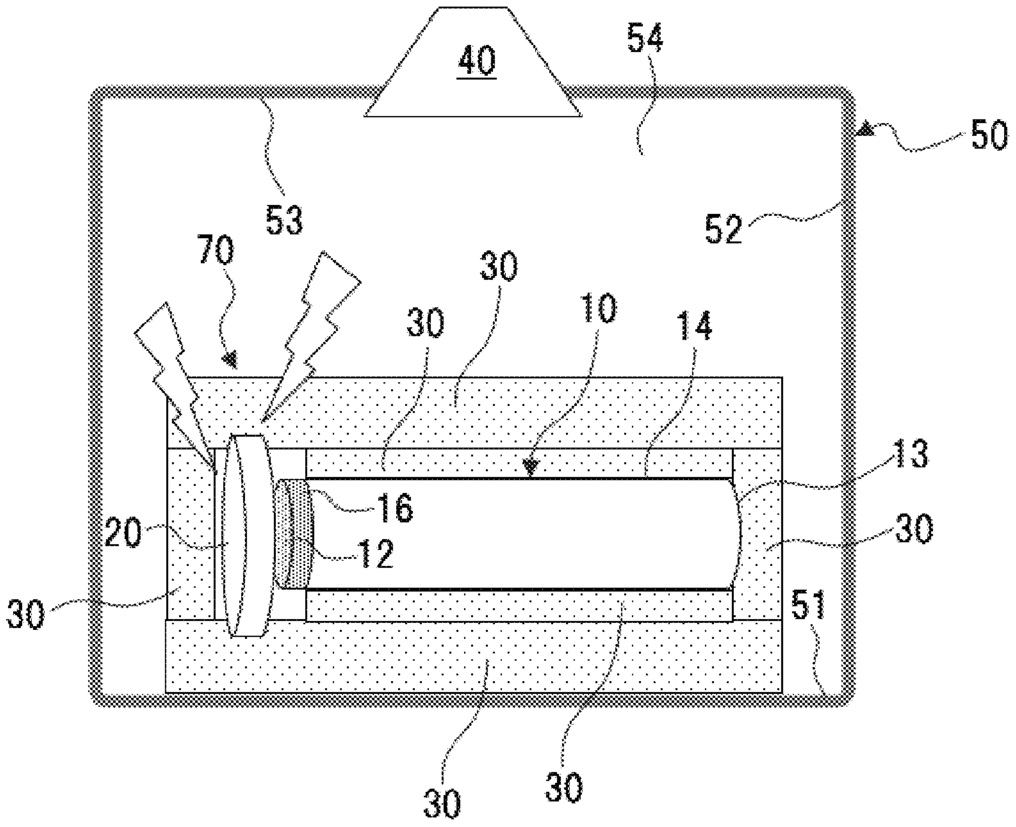
FIG. 1 is an illustrative schematic diagram according to one embodiment of the present invention, showing how an assembly in which a pillar-shaped ceramic and a heat-generating member are entirely covered with a heat-insulating material is prepared and placed in a firing furnace, and a coating material applied to one end surface of the ceramic is partially fired.

In the step A, a pillar-shaped ceramic 10 is prepared having a first end surface 12, a second end surface 13, and a side surface 14, with a coating material 16 applied to at least a part of one or both of the first end surface 12 and the second end surface 13 (see FIG. 1).

The shape of the first end surface and the second end surface of the pillar-shaped ceramic is not limited, but for example, round shapes such as a circles, an ellipse, a racetrack and an oval, polygonal shapes such as a triangle and a quadrangle (rectangles, squares), and other irregular shapes are possible. When the first end surface and the second end surface are polygonal, the corners may be chamfered. In the ceramic shown in FIG. 1 the first end surface and the second end surface are circular, and the ceramic has a cylindrical outer shape as a whole.

Figure 2:
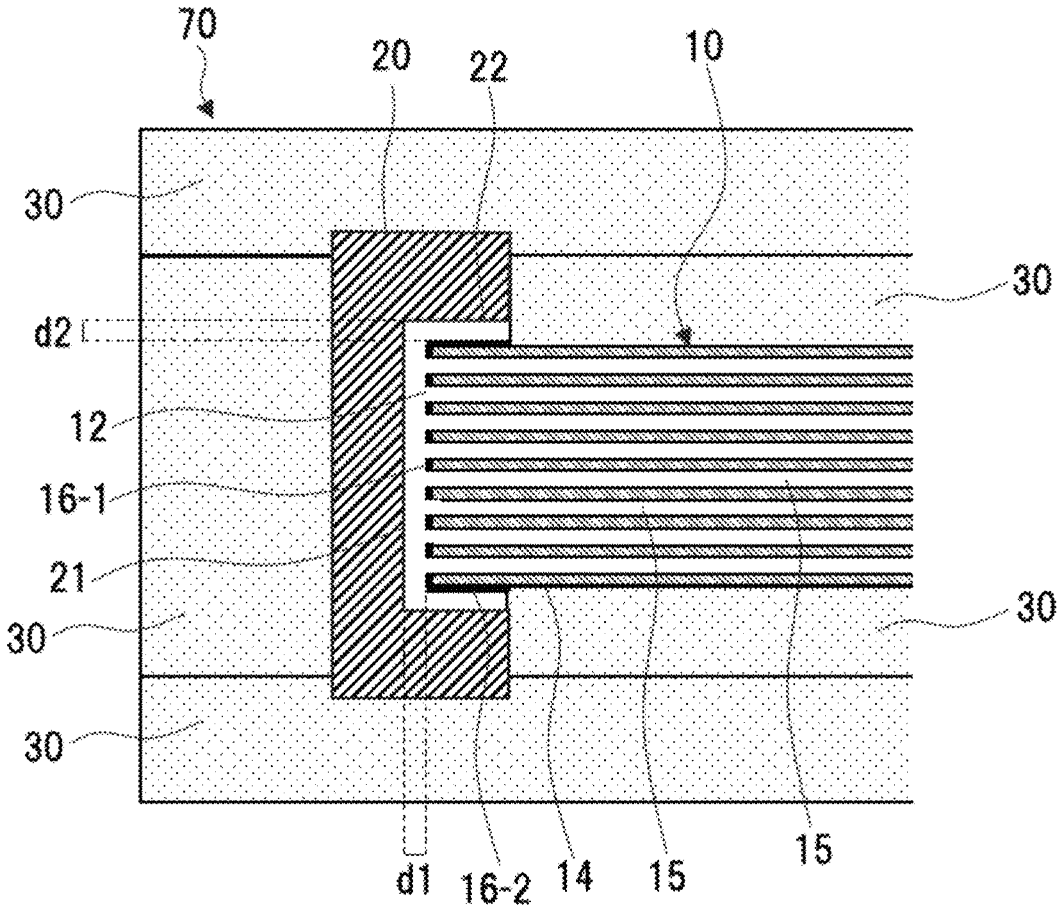
FIG. 2 is an exemplary schematic diagram showing a cross-sectional structure near one end surface of an assembly in which a pillar-shaped ceramic and a heat-generating member are entirely covered with a heat-insulating material.

Referring to FIG. 2, the pillar-shaped ceramic 10 may have one or more flow paths 15 extending from the first end surface 12 to the second end surface 13. The flow path may penetrate through the interior of the ceramic from the first end surface to the second end surface and have openings formed at both ends, or sealing portions may be formed at one or both ends.

The height of the pillar-shaped ceramic (the length from the first end surface to the second end surface) is not particularly limited and may be appropriately set according to the application and required performance. There is no particular limitation on the relationship between the height of the pillar-shaped ceramic and the maximum diameter of each end surface (referring to the maximum length among the diameters passing through the center of gravity of each end surface of the pillar-shaped ceramic). Therefore, the height of the pillar-shaped ceramic may be longer than the maximum diameter of each end surface, or the height of the pillar-shaped ceramic may be shorter than the maximum diameter of each end surface.

However, assuming H is the height of the pillar-shaped ceramic, and D is an equivalent circle diameter of the first end surface and the second end surface (the diameter of a circle having an area equal to the area of the first end surface and the second end surface), it is preferable that $1.0 \leq H/D$ be satisfied, more preferable that 3.0 $ H/D be satisfied, and even more preferable that $5.0 \leq H/D$ be satisfied. This is because it is possible to enhance the effect of firing the coating material partially applied to one or both end surfaces of the pillar-shaped ceramic in a short time with reduced power consumption while suppressing the occurrence of cracks. Although there is no particular upper limit set for H/D, usually $H/D \leq 100$ is satisfied, typically $H/D \leq 75$ is satisfied, and more typically $H/D \leq 50$ is satisfied. Therefore, in a preferred embodiment, $1.0 \leq H/D \leq 100$ is satisfied, in a more preferred embodiment, $3.0 \leq H/D \leq 75$ is satisfied, and in a further preferred embodiment, 5.0 $ $H/D \leq 50$ is satisfied.

The specific dimensions of the pillar-shaped ceramic may be appropriately set depending on the application, and there are no particular limitations. However, from the viewpoint of enhancing the effect of firing in a short time with low power consumption while suppressing the occurrence of cracks, the height H of the pillar-shaped ceramic is preferably 5 cm or more, more preferably 50 cm or more, and even more preferably 100 cm or more. There is no particular upper limit set for the height H of the pillar-shaped ceramic, but from the viewpoint of ease of handling, it is preferably 250 cm or less, more preferably 200 cm or less, and even more preferably 150 cm or less. Therefore, the height H of the pillar-shaped ceramic is, for example, preferably 5 to 250 cm, more preferably 50 to 200 cm, and even more preferably 100 to 150 cm.

The material of the pillar-shaped ceramic may be appropriately selected depending on the application, and examples thereof include, but are not limited to, oxide ceramics such as alumina, silica, mullite, zirconia, spinel, indialite, sapphirine, corundum, titania, yttria, and cordierite, and non-oxide ceramics such as silicon carbide, silicon nitride, and aluminum nitride. Composites such as silicon-silicon carbide composites (for example, Si-bonded SiC), cordierite-silicon carbide composites, and the like may also be used. These may be used alone or in combination of two or more types. The pillar-shaped ceramic may further contain other components, such as one or more of glass, clay minerals, and the like. The pillar-shaped ceramic may be porous or dense. Here, dense refers to a porosity of 5% or less. The porosity is a value measured by a mercury porosimeter.

When the pillar-shaped ceramic has one or more flow paths extending from the first end surface to the second end surface, a functional film for exerting a predetermined function may be provided on the surface of each flow path. The functional film may be porous. The predetermined function may include, but is not limited to, a function to selectively separate a target gas or liquid (for example, $CO_2$, $H_2$, $N_2$, water), and a function to adsorb a target substance (for example, particles such as soot, moisture). In addition, a catalyst may be carried on the surface of each flow path. Examples of the catalyst include exhaust gas purification catalysts (oxidation catalysts, LNT catalysts, SCR catalysts, and the like), catalysts for decomposing ammonia into hydrogen, catalysts for promoting the reverse shift reaction that reduces $CO_2$ to CO, and FT synthesis catalysts that synthesize hydrocarbons from carbon monoxide and hydrogen, and the like.

There is no particular limitation on the method for producing the pillar-shaped ceramic, and they can be produced by any known method. An example of such a method includes a step of kneading a raw material composition containing desired ceramic raw materials, a dispersion medium, a pore-forming material, and the like to form a green body, and then extrusion molding the green body through a specified die to obtain a formed body, and a step of drying and firing the formed body. In the extrusion molding, it is possible to form a plurality of flow paths extending from the first end surface to the second end surface by using a die having a shape corresponding to the cross-sectional shape, number, and positions of the desired plurality of flow paths. Dispersants and other additives may be blended into the raw material composition as necessary.

The pillar-shaped ceramic 10 prepared in the step A has a coating material 16-1 applied to at least a part of one or both of the first end surface 12 and the second end surface 13 (see FIG. 2). The location on one or both of the first end surface and the second end surface to which the coating material should be applied may be appropriately selected depending on the purpose, and there are no particular limitations. For example, the coating material may be applied to the entire surface of one or both of the first end surface and the second end surface. In addition, when the pillar-shaped ceramic has flow paths penetrating through the interior of the ceramic from the first end surface to the second end surface, and the first end surface and the second end surface have openings that form the ends of the flow paths, the coating material may be applied to the part of one or both of the first end surface and the second end surface excluding the openings.

The coating material applied to one end surface may extend continuously to the side surface near the end surface. Therefore, in one embodiment, the pillar-shaped ceramic 10 prepared in the step A further has a coating material 16-2 applied to at least a part of one or both of a portion of the side surface 14 near the first end surface and a portion of the side surface 14 near the second end surface (see FIG. 2). The portion of the side surface near the first end surface (or the portion of the side surface near the second end surface) refers to, for example, a portion of the side surface that is within ⅕, typically within 1/10, and more typically within 1/20 of the height H of the pillar-shaped ceramic from the first end surface (or the second end surface) in the height direction of the pillar-shaped ceramic.

The material of the coating material may be appropriately selected depending on the application, and there are no particular restrictions as long as the properties of the coating material can be changed by firing. For example, the term “firing” includes forming a film by heating the coating material to the melting point or higher, or forming a film by heating the coating material to a temperature below the melting point and sintering the material. The coating material, for example, may contain glass frit and the like. The glass frit can be provided in a powder form and may contain, for example, $SiO_2$, $ZrO_2$, $Li_2O$, $K_2O$, $Cs_2O$, MgO, CaO, SrO, and BaO. Further, the coating material may also contain thickeners, dispersants, metals, clays, and other additives as necessary.

The coating material may be applied directly to at least a part of one or both of the first end surface and the second end surface. The coating material may be mixed with a dispersion medium to form a coating composition, which may then be applied. Examples of the dispersion medium include, but are not limited to, water and water-soluble dispersion media such as alcohol. Water is preferred from the viewpoint of the working environment. The method for applying the coating material is not particularly limited, and examples thereof include a method using a spray coater, a roll coater, a dip coater, a spin coater, a screen printer, an inkjet coater, or the like. Furthermore, examples thereof include a brush coating method and a stamp method.

<Step B>

In the step B, an assembly 70 is prepared in which the pillar-shaped ceramic 10 and at least one heat-generating member 20 are entirely covered with a heat-insulating material 30 on the condition that the at least one heat-generating member 20 is disposed facing one or both of the first end surface 12 and the second end surface 13 to which the coating material 16 is applied, and the heat-insulating material 30 is in contact with the side surface 14 of the pillar-shaped ceramic 10 and surrounds the side surface 14 (see FIGS. 1 and 2). When the coating material is applied to both the first end surface and the second end surface, it is preferable from the viewpoint of production efficiency to dispose a heat-generating member facing the first end surface and a heat-generating member facing the second end surface, respectively.

By arranging the heat-generating member facing one or both of the first end surface and the second end surface to which the coating material is applied, it becomes possible to locally heat the coating material. This allows the coating material to be fired without heating the entire pillar-shaped ceramic, making it possible to fire the material in a short time with little power consumption. Furthermore, since the heat-generating member is arranged only on the first end surface and/or the second end surface, the temperature difference in the pillar-shaped ceramic occurs mainly in the height direction of the ceramic, and is unlikely to occur in a direction perpendicular to the height direction. Therefore, the thermal expansion that occurs acts in the height direction and is less likely to occur in the direction from the central axis toward the side surface (outer peripheral surface). Furthermore, since the heat-insulating material is in contact with and surrounds the side surface of the pillar-shaped ceramic, the side surface that does not need to be heated are covered with the heat-insulating material, making it possible to suppress thermal expansion. Furthermore, the heat-insulating material is expected to act as a corrective mold to suppress thermal strain. Due to the above mechanism, it is possible to suppress the occurrence of cracks even if the temperature is raised more rapidly than when the entire ceramic is heated.

From the viewpoint of enhancing the effect of suppressing thermal expansion on the side surface of the pillar-shaped ceramic, it is desirable that the ratio of the area in contact with the heat-insulating material to the total area of the side surface is large. Therefore, it is preferable for the heat-insulating material in the assembly to contact 60% or more, more preferably 80% or more, and even more preferably 90% or more, of the total area of the side surface of the pillar-shaped ceramic. The ratio of the area in contact with the heat-insulating material to the total area of the side surface of the pillar-shaped ceramic may be 100%.

However, as described above, the coating material may be applied to a portion of the side surface of the pillar-shaped ceramic near the first end surface and/or a portion of the side surface near the second end surface. In such a case, it is preferable that the heat-insulating material in the assembly does not come into contact with the part to which the coating material is applied in the portion of the side surface near the first end surface and the portion of the side surface near the second end surface. This is because the heat-insulating material inhibits the firing of the coating material. Therefore, when the coating material is applied to a portion of the side surface near the first end surface and the portion of the side surface near the second end surface of the pillar-shaped ceramic body, the heat-insulating material in the assembly preferably contacts 60% or more, more preferably 80% or more, and even more preferably 90% or more, of the total area of the side surface of the pillar-shaped ceramic that is not coated with the coating material.

There are no particular limitations on the material of the heat-insulating material, but it is common for the heat-insulating material to contain ceramics such as silica, alumina, calcium silicate, or the like. In addition, the heat-insulating material may be in the form of, for example, a fiber or a porous material. In particular, from the viewpoint of heat insulating properties, it is preferable to use a porous material, and from the viewpoint of adhesion, it is preferable to use a fiber material.

It is preferable that at least one heat-generating member 20 in the assembly 70 has a surface 21 that faces and is parallel to one or both of the first end surface 12 and the second end surface 13 to which the coating material 16 is applied (see FIG. 2). This is because the heat generated from the heat-generating member is likely to be evenly transferred to the coating material, thereby improving the uniformity of the coating. A heat-generating member having such a function may have, for example, a flat plate-like outer shape, and is preferably arranged such that its plate surface faces the end surfaces (the first end surface or the second end surface) of the pillar-shaped ceramic.

In addition, it is preferable that at least one heat-generating member 20 in the assembly 70 has a surface 21 that faces the entire surface of one or both of the first end surface 12 and the second end surface 13 to which the coating material 16 is applied (see FIG. 2). This is because by increasing the uniformity of the heat history that the coating material receives from the heat-generating member, it is possible to increase the uniformity of the coating. The heat-generating member having a surface facing the entire surface of the first end surface (the second end surface) means that any normal extending outward from the first end surface (the second end surface) will have an intersection with the heat-generating member. A heat-generating member having such a function may have, for example, a flat plate-like outer shape, and it is preferable that the area of the plate surface is the same as or larger than the area of the facing end surface (the first end surface or the second end surface), and that the plate surface is arranged so as to face the end surface (the first end surface or the second end surface) of the pillar-shaped ceramic.

The heat-generating member may be in contact with the coating material applied to the facing first end surface (or the second end surface), but since there is a risk that they stick together during firing, it is preferable to leave a space therebetween. For example, the shortest distance d1 between the heat-generating member and the coating material applied to the first end surface (or the second end surface) is preferably 1 mm or more, and more preferably 2 mm or more. On the other hand, if the distance between the heat-generating member and the coating material is too large, the heating efficiency of the coating material decreases. For this reason, the shortest distance d1 between the heat-generating member and the coating material applied to the first end surface (the second end surface) is preferably 100 mm or less, and more preferably 50 mm or less. Therefore, the shortest distance d1 between the heat-generating member and the coating material applied to the first end surface (the second end surface) is preferably, for example, 1 to 100 mm, and more preferably 2 to 50 mm.

Furthermore, it is preferable that the distance between the heat-generating member and the coating material applied to the first end surface (the second end surface) is constant regardless of location. Therefore, the coefficient of variation (=standard deviation/arithmetic mean) of the distance between the heat-generating member and the coating material applied to the first end surface (the second end surface) is preferably 0.5 or less, more preferably 0.3 or less, and even more preferably 0.2 or less. In addition, the distance between the heat-generating member and the coating material applied to the first end surface (the second end surface) means the length of a normal extending to the heat-generating member outward from the surface of the coating material of the part of the end surface where the coating material is applied.

In addition, when the coating material 16-2 is applied to the portion of the side surface 14 of the pillar-shaped ceramic 10 near the first end surface and/or the portion of the side surface 14 near the second end surface, it is preferable that at least one heat-generating member 20 in the assembly 70 has a surface 21 that faces the entire surface of one or both of the first end surface 12 and the second end surface 13 to which the coating material 16 is applied, and also has a surface 22 facing the part to which the coating material 16-2 is applied in the portion of the side surface 14 near the first end surface and the portion of the side surface 14 near the second end surface, and it is more preferable that it has a surface 22 facing all the part to which the coating material 16-2 is applied in the portion of the side surface 14 near the first end surface and the portion of the side surface 14 near the second end surface (see FIG. 2). This is because by increasing the uniformity of the heat history that the coating material receives from the heat-generating member, it is possible to increase the uniformity of the coating.

The fact that the heat-generating member has a surface facing all the part to which the coating material is applied in the portion of the side surface of the pillar-shaped ceramic body near the first end surface (near the second end surface) means that any normal extending outward from the portion of the side surface where the coating material is applied will have an intersection with the heat-generating member. The heat-generating member having such a function may have, for example, a bottomed tubular outer shape, and it is preferably placed such that its bottom surface faces the end surface (the first end surface or the second end surface) of the pillar-shaped ceramic and that the inner peripheral surface of its tubular portion faces the portion of the side surface near the first end surface (the portion of the side surface near the second end surface) of the pillar-shaped ceramic.

The heat-generating member may be in contact with the coating material applied to the portion of the side surface near the first end surface (the portion of the side surface near the second end surface) of the pillar-shaped ceramic, but for the same reasons as above, it is preferable to leave a space. For example, the shortest distance d2 between the heat-generating member and the coating material applied to the portion near the first end surface (the portion near the second end surface) is preferably 1 mm or more, and more preferably 2 mm or more. On the other hand, if the distance between the heat-generating member and the coating material is too large, the heating efficiency of the coating material decreases. For this reason, the shortest distance d2 between the heat-generating member and the coating material applied to the portion near the first end surface (the portion near the second end surface) is preferably 100 mm or less, and more preferably 50 mm or less. Therefore, the shortest distance d2 between the heat-generating member and the coating material applied to the portion near the first end surface (the portion near the second end surface) is preferably, for example, 1 to 100 mm, and more preferably 2 to 50 mm.

Furthermore, it is preferable that the distance between the heat-generating member and the coating material applied to the portion of the side surface near the first end surface (the portion of the side surface near the second end surface) of the pillar-shaped ceramic is constant regardless of location. Therefore, the coefficient of variation of the distance between the heat-generating member and the coating material applied to the portion of the side surface near the first end surface (the portion of the side surface near the second end surface) is preferably 0.5 or less, more preferably 0.3 or less, and even more preferably 0.2 or less. In addition, the distance between the heat-generating member and the coating material applied to the portion of the side surface near the first end surface (the portion of the side surface near the second end surface) means the length of a normal extending to the heat-generating member outward from the surface of the coating material in the portion of the side where the coating material is applied.

The material of the heat-generating member may be appropriately selected depending on the method for generating heat from the heat-generating member. The method of generating heat from the heat-generating member is not limited, and examples include an induction heating method in which a coil is used to apply eddy current through a conductive material (the heat-generating material) to heat it, a dielectric heating method in which a dielectric (the heat-generating material) is placed between electrodes and high-frequency voltage is applied to heat it, an electromagnetic wave heating method in which electromagnetic wave such as microwave is irradiated to a dielectric (the heat-generating material) to heat it, and a resistance heating method in which an electric current is applied through a metal or nonmetallic heating element (the heat-generating material) to generate Joule heat. These may be used alone or in combination of two or more.

Among these, the microwave heating method is preferred because it allows the structure around the heat-generating member to be simplified. When a microwave heating method is adopted, the heat-generating member is required to contain a material that absorbs microwave, and any known substance having such properties can be used without restriction. For example, carbon, silicon carbide, iron oxide, and the like can be used as the material constituting the heat-generating member.

<Step C>

In the step C, the coating material applied to at least the part of one or both of the first end surface and the second end surface facing the at least one heat-generating member is fired by generating heat from the at least one heat-generating member of the assembly. When the coating material is applied to both the first end surface and the second end surface, it is preferable from the viewpoint of production efficiency to arrange a heat-generating member facing the first end surface and a heat-generating member facing the second end surface respectively, and to simultaneously generate heat from both.

The firing conditions may be appropriately set depending on the type of coating material, and are not particularly limited. For example, when the coating material contains glass frit, it is usually heated to 800° C. or higher, typically heated to 900° C. or higher, and can be heated to, for example, 920 to 980° C. In addition, the heating rate of the coating material can be 100° C./hr or more, and can also be 300° C./hr or more, and for example, 100 to 3000° C./hr, typically 300 to 3000° C./hr. Here, the heating rate of the coating material means the rate at which the temperature of the coating material first reaches the holding temperature from 25° C. after the start of heating.

[2. Firing Furnace]

According to one embodiment of the present invention, there is provided a firing furnace suitable for carrying out the method for producing a coated ceramic described above. Referring to FIG. 1, in one embodiment, the firing furnace may comprise a furnace body 50 having an accommodating space 54 for accommodating the assembly 70 in which the above-mentioned ceramic 10 and the heat-generating member 20 are entirely covered with the heat-insulating material 30, and an electrical energy supply source 40 for generating heat from the at least one heat-generating member 20 in the assembly 70. The furnace body 50 may comprise, for example, a furnace floor 51, an inner wall 52, and a ceiling 53.

The specific configuration around the heat-generating member may be any suitable configuration depending on the method for generating heat from the heat-generating member. In the case of an induction heating method in which a coil is used to apply eddy current through a conductive material (the heat-generating member) to generate Joule heat, an AC power source, a conductive wire, and a coil are required as the electric energy supply source. In the case of a dielectric heating method in which a dielectric (the heat-generating member) is placed between electrodes and high-frequency voltage is applied, an AC power source, a conductive wire, and electrodes are required as the electrical energy supply source. In the case of an electromagnetic wave heating method in which electromagnetic wave such as microwave is irradiated to a dielectric (the heat-generating member) to heat it, an electromagnetic wave oscillator such as a microwave oscillator is required as the electric energy supply source. The frequency of microwave irradiation may be, for example, 0.3 to 300 GHZ, and is preferably 2.4 to 2.5 GHZ. In the case of a resistance heating method in which an electric current is applied through a metal heating element or a non-metal heating element (the heat-generating member), a DC or AC power source and a conductive wire are required as the electric energy supply source.

The material constituting the inner wall of the furnace body may be appropriately selected depending on the method for generating heat from the heat-generating member. For example, when the electromagnetic wave heating method is adopted, the inner wall of the furnace body is preferably made of metal such as stainless steel that has high electrical conductivity and reflects electromagnetic wave such as microwave and confines it inside. In addition, it is also preferable to use a material having high heat resistance instead of metal, for example a sintered body in which silicon carbide powder is bonded with carbon.

The firing furnace may be a continuous furnace or a batch furnace. In addition, the firing furnace may have a gas inlet for introducing gas (air, nitrogen, oxygen, inert gas, or the like) for adjusting the atmosphere in the furnace and a gas outlet for discharging the gas in the furnace, as necessary. In addition, an opening and closing gate such as a door or a lid of the assembly may be provided.

EXAMPLES

[Test 1]

<1-1. Preparation of Cylindrical Ceramics>

Porous cylindrical ceramics having the following materials, external dimensions and structures were produced by means of ordinary methods, including preparing a green body, extrusion molding, drying, and firing.

Material: mixture of alumina and glass

External dimensions: φ30 mm×160 mmL

Multiple flow paths extending from the first end surface to the second end surface: Yes A coating material containing glass frit and water was applied in a thickness of about 30 μm to one entire end surface of the cylindrical ceramics prepared above and a portion of the side surface near the end surface (specifically, 30 mm in the height direction of the cylindrical ceramic from the end surface) with a brush application method, and then naturally dried. In this way, a required number of the cylindrical ceramics to which the coating material was applied were prepared for the following tests.

<1-2. Firing of Coating Material>

Comparative Examples 1-1 to 1-2

Figure 3:
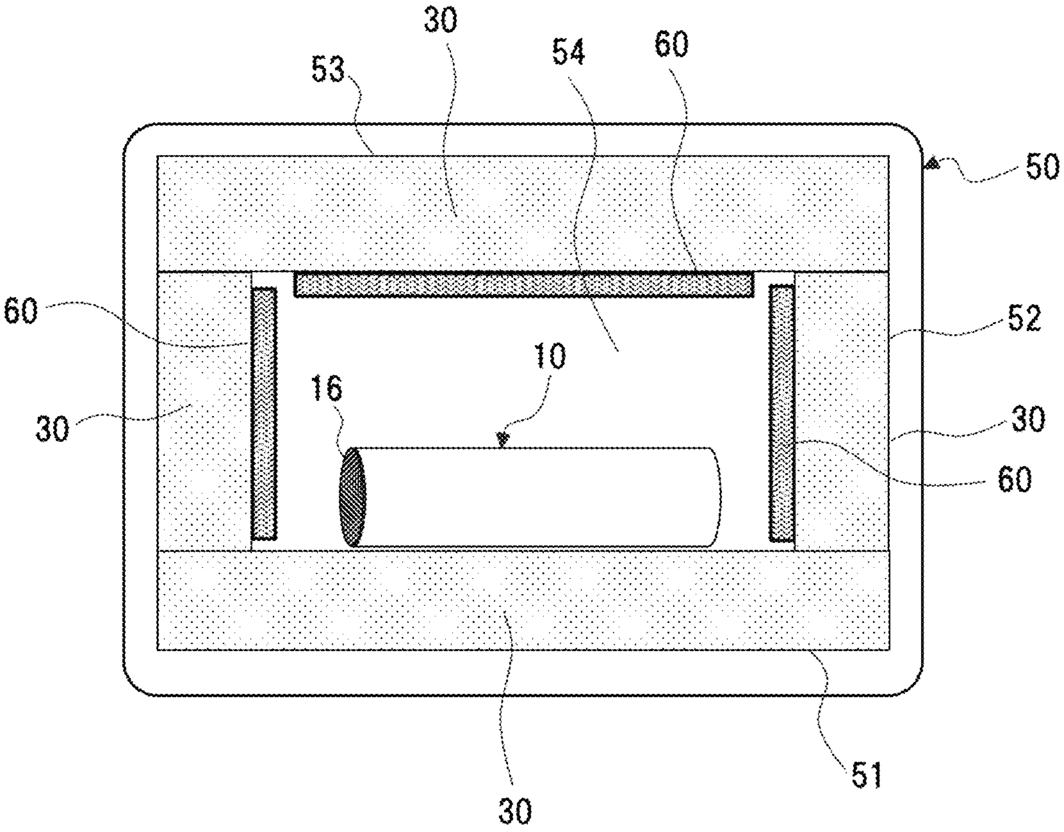
FIG. 3 is a schematic diagram showing a state in which a pillar-shaped ceramic is placed in a firing furnace used in Comparative Examples 1-1 to 1-2 and 2-1 to 2-2, and a coating material applied to one end surface of the ceramic is fired.

As shown in FIG. 3, a batch furnace having an accommodating space 54 surrounded by a furnace floor 51 (material: SS), four-sided inner wall 52 (material: SS), and a ceiling 53 (material: SS) inside a furnace body 50 was prepared. On the furnace floor 51, the four-sided inner wall 52, and the ceiling 53, a heat-insulating material 30 containing ceramics such as silica, alumina, calcium silicate, and the like was placed, respectively, and on the inside surface of the heat-insulating material 30 placed on the four-sided inner wall 52 and the heat-insulating material 30 placed on the ceiling 53, a heater 60 (using resistance heating method) was placed respectively.

A piece of the cylindrical ceramic 10 to which the coating material 16 as described above was applied was accommodated in this batch furnace, and by heating the heater 60, the firing of the coating material 16 was performed according to the heating rate, the holding temperature, the holding time, and the cooling rate shown in Table 1, respectively. At the time of firing, air was naturally introduced from the opening of the furnace and exhausted from the exhaust port to create an air atmosphere in the furnace.

The heating rate means the speed at which the temperature of a thermoelectric pair (≈the temperature of the coating material) provided near the center in the furnace rises from 25° C. to reach the holding temperature for the first time after the start of heating.

The holding temperature means the holding temperature of the thermoelectric pair (≈the temperature of the coating material) provided near the center in the furnace.

The holding time means the holding time at the holding temperature of the thermoelectric pair (≈the temperature of the coating material) provided near the center in the furnace.

The cooling rate means the speed at which the temperature of the thermoelectric pair (≈the temperature of the coating material) provided near the center in the furnace starts to drop from the holding temperature to reach 25° C. for the first time.

In Comparative Examples 1-1 to 1-2, the cooling rate was controlled by adjusting the heater output.

Comparative Examples 1-3 to 1-4

Figure 4:
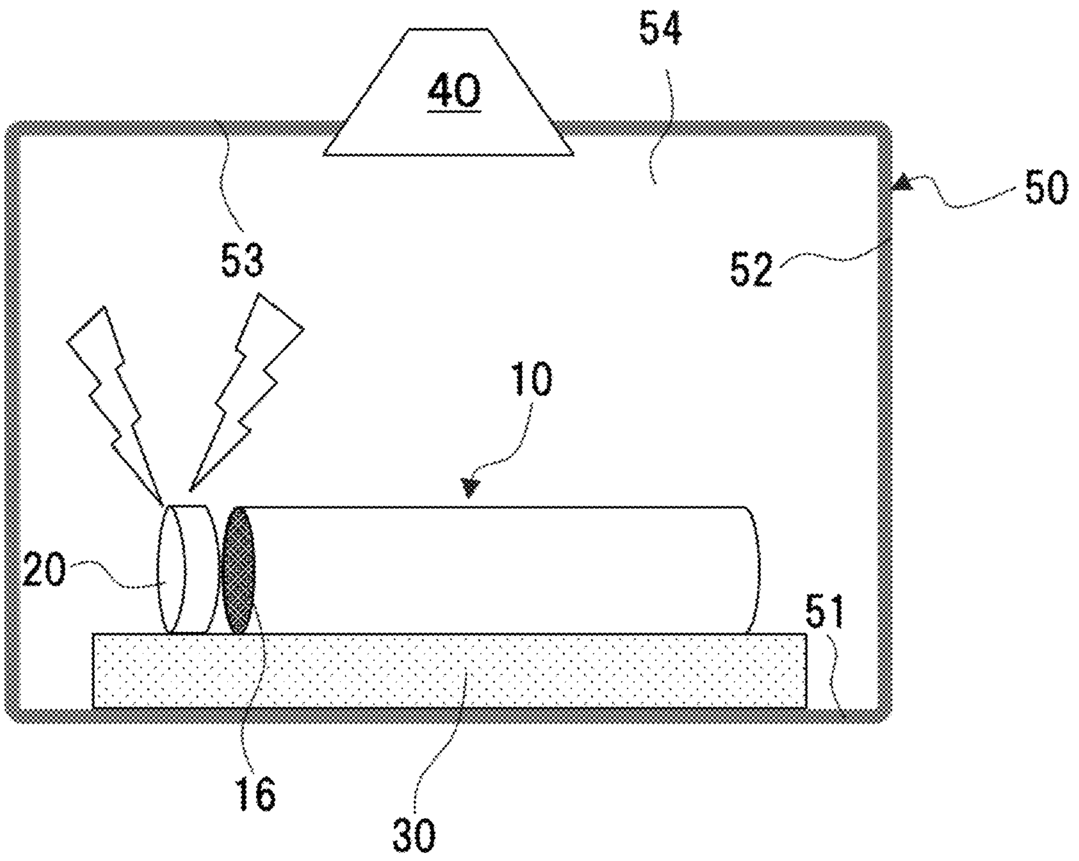
FIG. 4 is a schematic diagram showing a state in which a pillar-shaped ceramic is placed in a firing furnace used in Comparative Examples 1-3 to 1-4 and 2-3 to 2-4, and a coating material applied to one end surface of the ceramic is fired.

As shown in FIG. 4, a batch furnace having an accommodating space 54 surrounded by a furnace floor 51 (material: SUS), four-sided inner wall 52 (material: SUS), and a ceiling 53 (material: SUS) inside a furnace body 50 was prepared. A micro wave oscillator was installed on the ceiling 53 as an electric energy supply source 40. A piece of the cylindrical ceramic 10 to which the coating material 16 as described above was applied was placed in this batch furnace. At this time, the cylindrical ceramic 10 was placed on the heat-insulating material 30 laid on the furnace floor 51. Further, a heat-generating member (material: silicon carbide) 20 of φ 80 mm×3 mm thickness was placed over the side of the end surface of the ceramic 10 to which the coating material 16 was applied. Specifically, it was placed with a 5 mm gap (=the shortest distance) between the coating material 16 and the heat-generating member 20 such that the plate surface of the heat-generating member 20 faced the entire surface of the end surface to which the coating material was applied, and the plate surface of the heat-generating member 20 was parallel to the end surface. At this time, in order to maintain the positional relationship between the heat-generating member 20 and the cylindrical ceramic 10, the outer peripheral portion of the heat-generating member 20 was fitted into a recess provided in the heat-insulating material 30.

In this state, the microwave was irradiated, and the coating material 16 was fired 16 in accordance with the heating rate, the holding temperature, the holding time, and the cooling rate shown in Table 1, respectively.

The heating rate means the speed at which the temperature of a thermoelectric pair (≈the temperature of the coating material) provided near the end surface to which the coating material 16 was applied rises from 25° C. to reach the holding temperature for the first time after the start of heating.

The holding temperature means the holding temperature of the thermoelectric pair (≈the temperature of the coating material) provided near the end surface to which the coating material 16 was applied.

The holding time means the holding time at the holding temperature of the thermoelectric pair (≈the temperature of the coating material) provided near the end surface to which the coating material 16 was applied.

The cooling rate means the speed at which the temperature of the thermoelectric pair (≈the temperature of the coating material) provided near the end surface to which the coating material 16 was applied starts to drop from the holding temperature to reach 25° C. for the first time.

At the time of firing, air was naturally introduced from the opening of the furnace and exhausted from the exhaust port to create an air atmosphere in the furnace. In Comparative Examples 1-3 to 1-4, at the time of cooling, the furnace was naturally cooled (natural cooling by leaving it in the furnace), and no particular control was performed.

Examples 1-1 to 1-3

As shown in FIG. 1, a batch furnace having an accommodating space 54 surrounded by a furnace floor 51 (material: SUS), four-sided inner wall 52 (material: SUS), and a ceiling 53 (material: SUS) inside a furnace body 50 was prepared. A micro wave oscillator was installed on the ceiling 53 as an electric energy supply source 40. Further, a cylindrical tubular heat-generating member (material: silicon carbide) 20 with a bottom (outer diameter 80 mm×inner diameter 40 mm× height of tubular portion 38 mm× bottom depth of tubular portion 35 mm) as shown in FIG. 2 was placed over the side of the end surface 12 of the cylindrical ceramic 10 as described above to which the coating material 16 was applied. Specifically, it was placed such that the inner bottom surface of the heat-generating member 20 faced the entire surface of the end surface 12 to which the coating material was applied with a 5 mm gap (=the shortest distance) in a parallel positional relationship, and also such that the inner peripheral surface of the tubular portion of the heat-generating member 20 faced the side surface 14 to which the coating material was applied with a 5 mm gap (=the shortest distance).

Then, a flexible heat-insulating material (material: $SIO_2$, form: fiber) 30 was wrapped around the side surface 14 while contacting the side surface 14 such that the side surface 14 of the cylindrical ceramic 10 was entirely covered. Further, the ceramic 10 and the heat-generating member 20 were entirely covered by the heat-insulating material (material: $SIO_2$) 30, thereby preparing an assembly 70 composed of the cylindrical ceramic 10 to which the coating material 16 was applied, the heat-generating member 20, and the heat-insulating material 30. At this time, in order to maintain the positional relationship between the heat-generating member 20 and the cylindrical ceramic 10, the outer peripheral portion of the heat-generating member 20 was fitted into a recess provided in the heat-insulating material 30.

By accommodating a piece of the assembly 70 as described above in a batch furnace and irradiating it with microwave, the firing of the coating materials 16 was performed at the heating rate, the holding temperature, the holding time, and the cooling rate shown in Table 1, respectively.

The heating rate means the speed at which the temperature of a thermoelectric pair (≈the temperature of the coating material) provided near the end surface 12 to which the coating material 16 was applied rises from 25° C. to reach the holding temperature for the first time from the start of heating.

The holding temperature means the holding temperature of the thermoelectric pair (≈the temperature of the coating material) provided near the end surface 12 to which the coating material 16 was applied.

The holding time means the holding time at the holding temperature of the thermoelectric pair (≈the temperature of the coating material) provided near the end surface 12 to which the coating material 16 was applied.

The cooling rate means the speed at which the temperature of the thermoelectric pair (≈the temperature of the coating material) provided near the end surface 12 to which the coating material 16 was applied starts to drop from the holding temperature to reach 25° C. for the first time.

At the time of firing, air was naturally introduced from the opening of the furnace and exhausted from the exhaust port to create an air atmosphere in the furnace. In Examples 1-1 to 1-3, at the time of cooling, the furnace was naturally cooled (natural cooling by leaving it in the furnace), and no particular control was performed.

[Test 2]

<2-1. Preparation of Cylindrical Ceramics>

Porous cylindrical ceramics having the following materials, external dimensions and structures were produced by means of ordinary methods, including preparing a green body, extrusion molding, drying, and firing.

Material: mixture of alumina and glass

External dimensions: φ 180 mm×1000 mmL

Multiple flow paths extending from the first end surface to the second end surface: Yes A coating material containing glass frit and water was applied in a thickness of about 30 μm to one entire end surface of the cylindrical ceramics prepared above and a portion of the side surface near the end surface (specifically, 30 mm in the height direction of the cylindrical ceramic from the end surface) with an application method using stamp and brush, and then dried with a hot gas. In this way, a required number of the cylindrical to which the coating material was applied were prepared for the following tests.

<2-2. Firing of Coating Material>

Comparative Example 2-1 to 2-2

As shown in FIG. 3, a batch furnace having an accommodating space 54 surrounded by a furnace floor 51 (material: SS), four-sided inner wall 52 (material: SS), and a ceiling 53 (material: SS) inside a furnace body 50 was prepared. On the furnace floor 51, the four-sided inner wall 52, and the ceiling 53, a heat-insulating material 30 containing ceramics such as silica, alumina, calcium silicate, and the like was provided, respectively, and on the inside surface of the heat-insulating material 30 placed on the four-sided inner wall 52 and the heat-insulating material 30 placed on the ceiling 53, a heater 60 (using resistance heating method) was placed respectively.

A piece of the cylindrical ceramic 10 to which the coating material 16 as described above was applied was accommodated in this batch furnace, and by heating the heater 60, the firing of the coating material 16 was performed according to the heating rate, the holding temperature, the holding time, and the cooling rate shown in Table 2, respectively. At the time of firing, air was naturally introduced from the opening of the furnace and exhausted from the exhaust port to create an air atmosphere in the furnace.

The heating rate means the speed at which the temperature of a thermoelectric pair (≈the temperature of the coating material) provided near the center in the furnace rises from 25° C. to reach the holding temperature for the first time after the start of heating.

The holding temperature means the holding temperature of the thermoelectric pair (≈the temperature of the coating material) provided near the center in the furnace.

The holding time means the holding time at the holding temperature of the thermoelectric pair (≈the temperature of the coating material) provided near the center in the furnace.

The cooling rate means the speed at which the temperature of the thermoelectric pair (≈the temperature of the coating material) provided near the center in the furnace starts to drop from the holding temperature to reach 25° C. for the first time.

In Comparative Examples 2-1 to 2-2, the cooling rate was controlled by adjusting the heater output.

Comparative Examples 2-3 to 2-4

As shown in FIG. 4, a batch furnace having an accommodating space 54 surrounded by a furnace floor 51 (material: SUS), four-sided inner wall 52 (material: SUS), and a ceiling 53 (material: SUS) inside a furnace body 50 was prepared. A micro wave oscillator was installed on the ceiling 53 as an electric energy supply source 40. A piece of the cylindrical ceramic 10 to which the coating material 16 as described above was applied was placed in this batch furnace. At this time, the cylindrical ceramic 10 was placed on the heat-insulating material 30 laid on the furnace floor 51. Further, a heat-generating member (material: silicon carbide) 20 of φ 190 mm×3 mm thickness was placed over the side of the end surface of the ceramic 10 to which the coating material 16 was applied. Specifically, it was placed with a 5 mm gap (=the shortest distance) between the coating material 16 and the heat-generating member 20 such that the plate surface of the heat-generating member 20 faced the entire surface of the end surface to which the coating material was applied, and the plate surface of the heat-generating member 20 was parallel to the end surface. At this time, in order to maintain the positional relationship between the heat-generating member 20 and the cylindrical ceramic 10, the outer peripheral portion of the heat-generating member 20 was fitted into a recess provided in the heat-insulating material 30.

In this state, the microwave was irradiated, and the coating material 16 was fired 16 in accordance with the heating rate, the holding temperature, the holding time, and the cooling rate shown in Table 2, respectively. At the time of firing, air was naturally introduced from the opening of the furnace and exhausted from the exhaust port to create an air atmosphere in the furnace.

The heating rate means the speed at which the temperature of a thermoelectric pair (≈the temperature of the coating material) provided near the end surface to which the coating material 16 was applied rises from 25° C. to reach the holding temperature for the first time after the start of heating.

The holding temperature means the holding temperature of the thermoelectric pair (≈the temperature of the coating material) provided near the end surface to which the coating material 16 was applied.

The holding time means the holding time at the holding temperature of the thermoelectric pair (≈the temperature of the coating material) provided near the end surface to which the coating material 16 was applied.

The cooling rate means the speed at which the temperature of the thermoelectric pair (≈the temperature of the coating material) provided near the end surface to which the coating material 16 was applied starts to drop from the holding temperature to reach 25° C. for the first time.

In Comparative Examples 2-3 to 2-4, at the time of cooling, the furnace was naturally cooled (natural cooling by leaving it in the furnace), and no particular control was performed.

Examples 2-1 to 2-3

As shown in FIG. 1, a batch furnace having an accommodating space 54 surrounded by a furnace floor 51 (material: SUS), four-sided inner wall 52 (material: SUS), and a ceiling 53 (material: SUS) inside a furnace body 50 was prepared. A micro wave oscillator was installed on the ceiling 53 as an electric energy supply source 40. Further, a cylindrical tubular heat-generating member (material: silicon carbide) 20 with a bottom (outer diameter 196 mm× inner diameter 190 mm× height of tubular portion 38 mm× bottom depth of tubular portion 35 mm) as shown in FIG. 2 was placed over the side of the end surface 12 of the cylindrical ceramic 10 as described above to which the coating material 16 was applied. Specifically, it was placed such that the inner bottom surface of the heat-generating member 20 faced the entire surface of the end surface 12 to which the coating material was applied with a 5 mm gap (=the shortest distance) in a parallel positional relationship, and also such that the inner peripheral surface of the tubular portion of the heat-generating member 20 faced the side surface 14 to which the coating material was applied with a 5 mm gap (=the shortest distance).

Then, a flexible heat-insulating material (material: $SIO_2$, form: fiber) 30 was wrapped around the side surface 14 while contacting the side surface 14 such that the side surface 14 of the cylindrical ceramic 10 was entirely covered. Further, the ceramic 10 and the heat-generating member 20 were entirely covered by the heat-insulating material (material: $SIO_2$) 30, there by preparing an assembly 70 composed of the cylindrical ceramic 10 to which the coating material 16 was applied, the heat-generating member 20, and the heat-insulating material 30. At this time, in order to maintain the positional relationship between the heat-generating member 20 and the cylindrical ceramic 10, the outer peripheral portion of the heat-generating member 20 was fitted into a recess provided in the heat-insulating material 30.

By accommodating a piece of the assembly 70 as described above in a batch furnace and irradiating it with microwave, the firing of the coating materials 16 was performed at the heating rate, the holding temperature, the holding time, and the cooling rate shown in Table 2, respectively. At the time of firing, air was naturally introduced from the opening of the furnace and exhausted from the exhaust port to create an air atmosphere in the furnace.

The heating rate means the speed at which the temperature of a thermoelectric pair (≈the temperature of the coating material) provided near the end surface 12 to which the coating material 16 was applied rises from 25° C. to reach the holding temperature for the first time from the start of heating.

The holding temperature means the holding temperature of the thermoelectric pair (≈the temperature of the coating material) provided near the end surface 12 to which the coating material 16 was applied.

The holding time means the holding time at the holding temperature of the thermoelectric pair (≈the temperature of the coating material) provided near the end surface 12 to which the coating material 16 was applied.

The cooling rate means the speed at which the temperature of the thermoelectric pair (≈the temperature of the coating material) provided near the end surface 12 to which the coating material 16 was applied starts to drop from the holding temperature to reach 25° C. for the first time.

In Examples 2-1 to 2-3, at the time of cooling, the furnace was naturally cooled (natural cooling by leaving it in the furnace), and no particular control was performed.

[3. Evaluation of Power Consumption]

The power consumption when the coating material was fired was evaluated for the Examples and Comparative Examples of the above Tests 1 and 2. The power consumption was the amount of power consumed using a power meter placed on the power supply.

The results are shown in Table 1 and Table 2.

[4. Evaluation of Cracks and Defects]

For the Examples and Comparative Examples of the above Tests 1 and 2, the presence or absence of cracks and defects on the end surfaces and the side surface of the cylindrical ceramic after firing the coating material were investigated by visual inspection and SEM substantial observation method. Here, a crack refers to breakage and fracture on the coating surface, and a defect refers to peeling or missing of the coating. The evaluation was performed on the following criteria. The results are shown in Table 1 and Table 2.

Circle (○): Neither cracks nor defects could be confirmed.

Cross (x): At least one of cracks and defects was confirmed.

cracks and/or defects in the coating even if the heating rate was extremely high to 3000° C./hr. In addition, as can be seen from the results of Example 1-1, Example 1-2, and Example 1-3, it is also understood that that the higher heating rate was, the more reduction in the power consumption.

(Test 2)

In Test 2, a larger sample than Test 1 was used, but the same can be said as in Test 1.

TABLE 1

| | Resistance heating | | Local heating | | | | |
|---|---|---|---|---|---|---|---|
| | | | Without heat insulation | | With heat insulation | | |
| | Comparative Example 1-1 | Comparative Example 1-2 | Comparative Example 1-3 | Comparative Example 1-4 | Example 1-1 | Example 1-2 | Example 1-3 |
| Heating rate | 100° C./hr | 300° C./hr | 100° C./hr | 300° C./hr | 100° C./hr | 300° C./hr | 3000° C./hr |
| Holding temperature | 950° C. | 950° C. | 950° C. | 950° C. | 950° C. | 950° C. | 950° C. |
| Holding time | 3 hr | 3 hr | 3 hr | 3 hr | 3 hr | 3 hr | 3 hr |
| Cooling rate | 100° C./hr | 300° C./hr | 600° C./hr (Natrual cooling) | 600° C./hr (Natrual cooling) | 300° C./hr (Natrual cooling) | 300° C./hr (Natrual cooling) | 300° C./hr (Natrual cooling) |
| Power consumption | 6800 kJ/ Sample | 4500 kJ/ sample | 7500 kJ/ sample | 6000 kJ/ sample | 5000 kJ/ sample | 4000 kJ/ sample | 3000 kJ/ sample |
| Cracks & defects | ○ | X | ○ | X | ○ | ○ | ○ |

TABLE 2

| | Resistance heating | | Local heating | | | | |
|---|---|---|---|---|---|---|---|
| | | | Without heat insulation | | With heat insulation | | |
| | Comparative Example 2-1 | Comparative Example 2-2 | Comparative Example 2-3 | Comparative Example 2-4 | Example 2-1 | Example 2-2 | Example 2-3 |
| Heating rate | 10° C./hr | 100° C./hr | 10° C./hr | 100° C./hr | 10° C./hr | 100° C./hr | 300° C./hr |
| Holding temperature | 950° C. | 950° C. | 950° C. | 950° C. | 950° C. | 950° C. | 950° C. |
| Holding time | 3 hr | 3 hr | 3 hr | 3 hr | 3 hr | 3 hr | 3 hr |
| Cooling rate | 10° C./hr | 100° C./hr | 200° C./hr (Natrual cooling) | 200° C./hr (Natrual cooling) | 100° C./hr (Natrual cooling) | 100° C./hr (Natrual cooling) | 100° C./hr (Natrual cooling) |
| Power consumption | 500000 kJ/ Sample | 330000 kJ/ sample | 550000 kJ/ sample | 440000 kJ/ sample | 350000 kJ/ sample | 80000 kJ/ sample | 60000 kJ/ sample |
| Cracks & defects | ○ | X | ○ | X | ○ | ○ | ○ |

[5. Discussion]

(Test 1)

First, Comparative Example 1-1, Comparative Example 1-3, and Example 1-1, in which the heating rate was 100° C./hr, were compared. In Comparative Example 1-1, the entire ceramic was heated by resistance heating. In Comparative example 1-3 and Example 1-1, local heating was performed. However, in Comparative Example 1-3, since the entire ceramic and the heat-generating member were not covered with the heat-insulating material, the power consumption increased. On the other hand, in Example 1-1, the entire ceramic and heat-generating member were covered with the heating insulating material, so that the coating was efficiently fired, and power consumption was reduced. The same can be said to the comparison among Comparative Example 1-2, Comparative Example 1-4, and Example 1-2, with the heating rate of 300° C./hr. In addition, in Comparative Example 1-2 and Comparative Example 1-4, the increase in the heating rate to 300° C./hr caused occurrence of cracks and/or defects in the coating. On the other hand, as can be seen from the results of Example 1-3, there was no

DESCRIPTION OF REFERENCE NUMERALS

10 Pillar-shaped ceramic
12 First end surface
13 Second end surface
14 Side surface
15 Flow path
16 Coating material
16-1 Coating material applied to first end surface (or second end surface) of pillar-shaped ceramic
16-2 Coating material applied to portion of side surface near first end surface (or near second end surface) of pillar-shaped ceramic
20 Heat-generating member
21 Surface of heat-generating member facing first end surface (or second end surface) of pillar-shaped ceramic
22 Surface of heat-generating member facing portion of side surface near first end surface (or near second end surface) of pillar-shaped ceramic
30 Heat-insulating material

40 Electric energy supply source
50 Furnace body
51 Furnace floor
52 Inner wall
53 Ceiling
54 Accommodating space
60 Heater of resistance heating type
70 Assembly

The invention claimed is:

1. A method for producing a coated ceramic, comprising:

a step A of preparing a pillar-shaped ceramic having a first end surface, a second end surface, and a side surface, wherein a coating material is applied to at least a part of one or both of the first end surface and the second end surface;

a step B of preparing an assembly in which the ceramic and at least one heat-generating member are entirely covered with a heat-insulating material, on a condition that the at least one heat-generating member is disposed facing one or both of the first end surface and the second end surface to which the coating material is applied, and the heat-insulating material is in contact with the side surface and surrounds the side surface, wherein the at least one heat-generating member is disposed facing one or both of the first end surface and the second end surface means at least one normal extending outward from one or both of the first end surface and the second end surface has an intersection with the heat-generating member; and a step C of firing the coating material applied to at least the part of one or both of the first end surface and the second end surface facing the at least one heat-generating member by generating heat from the at least one heat-generating member of the assembly;

wherein the first end surface is a planar surface, the second end surface is a planar surface disposed parallel and directly opposite to the first end surface in a length direction of the pillar-shaped ceramic, and the side surface is perpendicular to the first end surface and the second end surface in the length direction of the pillar-shaped ceramic; and wherein the coating material comprises a glass frit.

2. The method for producing according to claim 1, wherein the coating material is further applied to at least a part of one or both of a portion of the side surface near the first end surface and a portion of the side surface near the second end surface of the ceramic prepared in the step A.

3. The method for producing according to claim 2, wherein the insulating material in the assembly prepared in the step B does not come into contact with the part to which the coating material is applied in the portion of the side surface near the first end surface and the portion of the side surface near the second end surface.

4. The method for producing according to claim 1, wherein the heat-insulating material in the assembly prepared in the step B contacts 60% or more of a total area of the side surface.

5. The method for producing according to claim 1, wherein the at least one heat-generating member in the assembly prepared in the step B has a surface that faces and is parallel to one or both of the first end surface and the second end surface to which the coating material is applied.

6. The method for producing according to claim 1, wherein the at least one heat-generating member in the assembly prepared in the step B has a surface that faces the entire surface of one or both of the first end surface and the second end surface to which the coating material is applied.

7. The method for producing according to claim 2, wherein the at least one heat-generating member in the assembly prepared in the step B has a surface facing the entire surface of one or both of the first end surface and the second end surface to which the coating material is applied, and has a surface facing the part to which the coating material is applied in one or both of the portion of the side surface near the first end surface and the portion of the side surface near the second end surface.

8. The method for producing according to claim 1, wherein the heat-generating member comprises a material that absorbs microwave, and the step C comprises irradiating the heat-generating member with microwave.

9. The method for producing according to claim 1, wherein assuming H is a length from the first end surface to the second end surface, and D is an equivalent circle diameter of the first end surface and the second end surface, $1.0 \leq H/D$ is satisfied.

10. The method for producing according to claim 1, wherein the ceramic has a plurality of flow paths extending from the first end surface to the second end surface.

* * * * *